(12) United States Patent  (10) Patent No.: US 8,494,950 B2
Kostic et al.  (45) Date of Patent: Jul. 23, 2013

(54) SYSTEM FOR CONDUCTING AN EXCHANGE OF CLICK-THROUGH TRAFFIC ON INTERNET WEB SITES

(76) Inventors: Miodrag Kostic, Serbia (YU); Guy Vandevelde, Ghent (BE)

( * ) Notice: Subject to any disclaimer, the term of this patent is extended or adjusted under 35 U.S.C. 154(b) by 3587 days.

(21) Appl. No.: 10/411,987

(22) Filed: Apr. 11, 2003

(65) Prior Publication Data

US 2003/0195837 A1  Oct. 16, 2003

Related U.S. Application Data

(63) Continuation-in-part of application No. 10/096,132, filed on Mar. 7, 2002.

(60) Provisional application No. 60/372,519, filed on Apr. 12, 2002, provisional application No. 60/274,604, filed on Mar. 9, 2001, provisional application No. 60/302,863, filed on Jul. 3, 2001.

(51) Int. Cl.
*G06Q 40/00* (2012.01)

(52) U.S. Cl.
USPC ............... 705/37; 705/14; 705/26; 706/57

(58) Field of Classification Search
USPC ............................................. 705/14, 26, 37
See application file for complete search history.

(56) References Cited

U.S. PATENT DOCUMENTS

| | | | |
|---|---|---|---|
| 6,907,566 B1 * | 6/2005 | McElfresh et al. | 715/517 |
| 2003/0093355 A1 * | 5/2003 | Issa | 705/37 |

OTHER PUBLICATIONS

Mediaplex News Release; Jul. 27, 2000; eBay and Mediaplex Sign Five-Year Advertising Technology Contract; Excerpt.*
Abstracts of Five Nerws Releases re. product or service testing prior to committing to a purchase or contractual Agreement.*

* cited by examiner

*Primary Examiner* — Siegfried E Chencinski
(74) *Attorney, Agent, or Firm* — Leighton K. Chong

(57) ABSTRACT

A system for exchanging click-through traffic between web sites of interested exchange partners on the Internet employs an intermediary web site for registering interested exchange partners and conducting a trial process for click-through traffic between exchange partners' web sites during a trial period prior to opening a bidding process of the interested exchange partners for an exchange partner's click-through traffic. Each exchange partner's web site is linked to the intermediary web site by embedding a links code which points to an addressable file stored with the intermediary web site containing the link content of each interested exchange partner's web site to be displayed in the links area on an exchange partner's web site during the trial process. The results of the exchange trials are compared with metrics for the exchange parameters that inform the exchange participants of the success of their interaction. The intermediary web site can then conduct a bidding process where the exchange participants can bid for click-through traffic from the exchange partner's web site. Based on the bidding process, the best matched exchange partners can establish an exchange relationship in which mutual click-through traffic is exchanged between the exchange partners' web sites.

5 Claims, 8 Drawing Sheets

SYSTEM FOR CONDUCTING AN EXCHANGE OF CLICK-THROUGH TRAFFIC ON INTERNET WEB SITES

This U.S. patent application claims subject matter based on the priority filing date of U.S. Provisional Application No. 60/372,519, filed on Apr. 12, 2002, and is a continuation-in-part of U.S. patent application Ser. No. 10/096,132, filed on Mar. 7, 2002, which claimed the priority filing dates of U.S. Provisional Application No. 60/274,604 filed on Mar. 9, 2001, and U.S. Provisional Application No. 60/302,863 filed on Jul. 3, 2001, all by the same inventors.

TECHNICAL FIELD

This invention generally relates to systems for commercializing the click-through traffic of visitors to Internet web sites, and more particularly, to a novel Internet-based system for facilitating the buying and selling of click-through traffic between the web sites of interested buyers and sellers.

BACKGROUND OF INVENTION

The commercial Internet has rapidly evolved in about 10 years into a worldwide medium for electronic commerce among hundreds of millions of users and billions of web sites. However, like all channels of commerce, the use of the Internet depends heavily on the development of efficient means for searching and for advertising to bring interested users to the web sites of vendors of relevant products, services, and/or information. Since it is difficult for individual web sites to gain visibility among millions of other sites, vendors have become greatly interested in getting users to visit their web sites by click-through links from search sites, portals, and aggregator sites that can attract large volumes of users on the Internet. As a result, a new market has been created for buying and selling click-through traffic on the Internet through various types of referral, affiliation, and other click-through-selling programs.

In the typical click-through selling today, a seller contracts with a buyer for an upfront fee to sell access to the click-through traffic visiting the seller's web site by posting a link to the buyer's Web site and then also charging the buyer for each visitor who clicks on the seller's link. However, other than a general idea of the total volume of visitors to the seller's web site, the buyer often does not know in advance what volume, responsiveness, or quality of visitors from the seller's web site will click on the link to the buyer's web site. Before contracting for linkage to a seller's web site, a buyer would want to know certain parameters for the click-through traffic, such as is the click-through ratio (linked traffic volume to total seller visitors), delivery speed (number of click-throughs delivered in a given time), and/or traffic quality (level of visitor interest for the buyer's products indicated by the number of pages visited and amount of time spent on the buyer's site). If a buyer could assess parameters such as these, the buyer can then compare one seller's web site to other sites, and determine what upfront fee and/or click-through fee the buyer can justify as the best possible price.

It is therefore highly desirable to have a system that can facilitate the buying and selling of click-through traffic between the web sites of interested buyers and sellers in ways which allow both parties to try out in advance how compatible their sites are. A productive relationship between a buyer and seller will depend on how compatible their sites are for sending the volume and quality of interested visitors that the parties contract for. If these factors can be assessed on an informed basis by conducting comparative trials in advance, the choice for a satisfactory and productive relationship becomes more likely.

SUMMARY OF INVENTION

The parent U.S. patent application Ser. No. 10/096,132, which is incorporated herein by reference, disclosed and claimed a system for buying and selling of click-through traffic between web sites of interested buyers and sellers on the Internet, having: (a) an intermediary web site accessible through the Internet for registering buyers and sellers; (b) a first facility for establishing a link from an interested seller's web site to the intermediary web site, and for storing link contents of a plurality of interested buyers' web sites at the intermediary web site so that they can be selectively addressed at the intermediary web site by a link from the interested seller's web site for display on the seller's web site to a click-through user visiting the seller's web site; (c) a second facility for conducting a trial of click-through traffic to be sent from the seller's web site to each of said plurality of interested buyers' web sites in turn through the intermediary web site during a trial of the seller with each respective buyer during a given trial period; (d) a third facility for conducting a bidding process after the trial period is concluded, in which buyers can bid a price each is willing to pay for the click-through traffic from the seller's web site; and (e) a fourth facility for enabling the seller to select a winning buyer and conclude a sale of click-through traffic from the seller's web site to the winning buyer's web site.

The intermediary web site conducts the trial by measuring the click-through traffic actually sent from the seller's web site to each designated buyer's web site during the trial period and displaying the measured traffic to the seller and buyers so that the buyers can make more informed bids and the seller can make a more informed winning bid selection during the bidding process. A buyer may approve linking with a number of sellers during more than one trial conducted in the same trial period, in order to assess which seller sends the best click-through traffic. The present invention also includes facilities for enabling buyers and sellers to conduct the trial process and/or the bidding process automatically or manually, or by direct exchange between the seller and a selected buyer. When the seller has selected the winning buyer and the sale is concluded by linking the seller's click-through traffic through the intermediary web site to the winning buyer's web site, the intermediary web site continues to measure the click-through traffic sent from the seller's web site to the winning buyer's web site, so that both parties can continue to monitor the productivity of their relationship. If either party should become dissatisfied with continuing the relationship, it may terminate the sale (the linking relationship) and re-enter the trial and bidding processes on the intermediary web site with other parties.

The intermediary web site can also enable a seller with a multi-page or multi-channel web site to conduct multiple trials with selected buyers simultaneously, by using seller subdesignations or aliases to set up separate trials and/or bidding processes with interested buyers for each corresponding page or channel of the seller's web site. Alternatively, the trial and bidding processes may be conducted in a reverse auction model, in which a buyer can open an offer to purchase click-through traffic of specified parameters for bidding to a number of interested sellers. The intermediary web site can implement a business model based upon a commission earned for each click-through sent from a seller's to a buyer's web site, a commission earned on each sale transaction concluded, or any other suitable business model for the exchange and/or auction site for buyers and sellers of click-through traffic.

In the present application, an improvement to the system allows two parties to try out and then conduct an exchange relationship where each is in effect a buyer of the other seller's click-through traffic. This system comprises:

(a) an intermediary web site accessible through the Internet for registering exchange partners interested in buying/selling click-through traffic of visitors to another exchange partner's web site;

(b) a first facility for establishing a link from a first exchange partner's (clicks-Sender) web site and for storing link contents of a plurality of other interested exchange partners' (clicks-Receivers) web sites at the intermediary web site, wherein the respective link content of each other exchange partner's web site can be addressed through the intermediary web site by the link from the first exchange partner's web site for display on the first exchange partner's web site;

(c) a second facility for conducting a trial of click-through traffic sent from said first exchange partner's web site to each of said plurality of other interested exchange partners by the intermediary web site conducting the addressing of the respective link content of each other interested exchange partner's web site in turn by the link from the first exchange partner's web site during a given trial period;

(d) a third facility for conducting a bidding process after the trial period is concluded, in which the other interested exchange partners can bid a price each is willing to pay for the click-through traffic from the first exchange partner's web site; and (e) a fourth facility for enabling the first exchange partner to select a winning bid of an interested exchange partner and conclude a sale of click-through traffic from the first exchange partner's web site to the winning other exchange partner's web site.

Similar to the trial process described in the parent U.S. patent application Ser. No. 10/096,132, the trial process program on the intermediary web site (ClicksBroker) first conducts a trial partner selection process for exchange partners to be accepted for trial, then conducts an automated trial process for the exchange partners to try out a relationship with each other. The exchange trial between each clicks-Sender and clicks-Receiver is recorded. The results of the exchange trials are compared with metrics for the exchange parameters that inform the exchange participants of the success of their interaction. The intermediary web site can then conduct a bidding process where the exchange participants can bid for click-through traffic from an exchange partner's web site. Based on the bidding process, the best matched exchange partners can establish an exchange relationship in which click-through traffic are exchanged between the exchange partners' web sites. Many other variations and improvements may be adapted to the trial, bidding, and sale/exchange relationship processes of the system.

Other objects, features, and advantages of the present invention will be explained in the following detailed description of the invention having reference to the appended drawings.

DETAILED DESCRIPTION OF INVENTION

Figure 1:
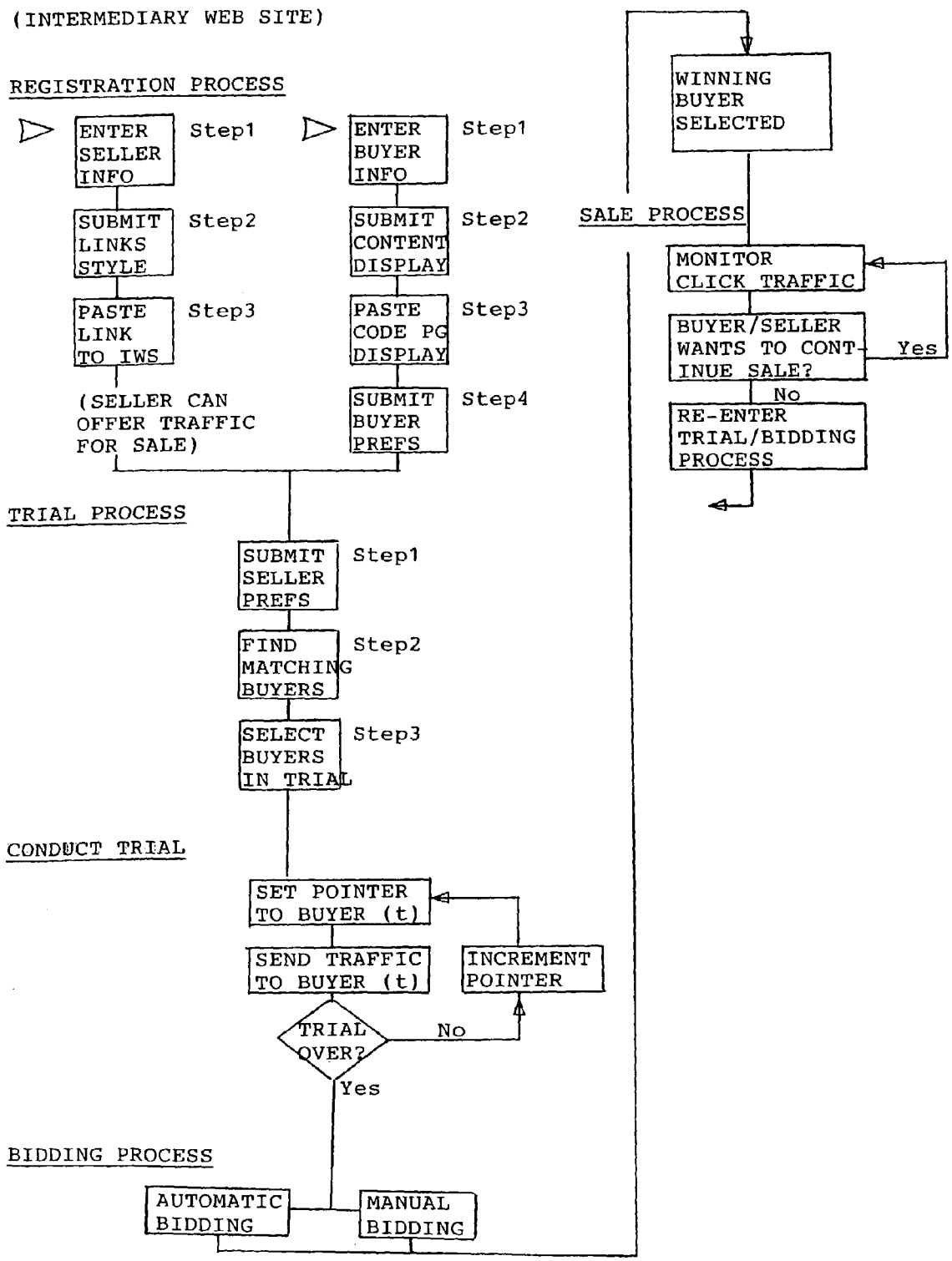
FIG. 1 is a schematic illustration of the main processes for a preferred implementation of the present invention.

Referring to FIG. 1, the main processes for a preferred implementation of the present invention are illustrated schematically. The Intermediary Web Site (IWS) offers facilities on the Internet for facilitating the buying and selling of click-through traffic between the web sites of interested buyers and sellers. In the Seller Registration Process, a Seller registers information about its web site in Step 1, submits the style(s) of links to be displayed on the Seller's web site in Step 2, and pastes a link code for redirecting the user visiting the Seller's web site and clicking on the embedded link to the Intermediary Web Site in Step 3. In the Buyer Registration Process, a Buyer registers information about its web site in Step 1, submits the content to be displayed at a link on a Seller's web site in Step 2, pastes the IWS code page for the Buyer's content with its web site program in Step 3, and chooses the Buyer's bidding preferences (minimum click-through, speed, quality) in Step 4. Upon registration, Sellers and Buyers are qualified and given access (e.g., by user ID and passcode) to areas designated for them, respectively, on the IWS site. Sellers and Buyers data are stored with the IWS database, and may be modified by the respective parties if desired.

A registered Seller may then offer its click-through traffic for bidding to any interested Buyers. The Seller initiates a sale offer by having a Trial Process and a Bidding Process conducted on the IWS site. In the Trial Process, the Seller submits its bidding preferences (minimum acceptable bid and minimum click-through ratio) at Step 1, the IWS then finds those Buyers whose bidding preferences match the Seller's and displays them for Seller selection in Step 2, and the Seller selects those Buyers it wishes to conduct a Trial with in Step 3. The IWS then conducts the Trial Process by sending click-through traffic linked to the IWS site to each one of the designated Buyers in turn during the Trial Period. For example, 10 Buyers may be selected, the Trial Period can remain open until each Buyer has received a sample of 20 clicks of the Seller's click-through traffic.

After the Trial Period is closed, the Bidding Process begins. Depending upon the policies of the IWS site, the Bidding Process may be conducted blind (each Buyer sees only the metrics for click-through traffic that Buyer received and the bid that Buyer chooses to make), or in the open (all Buyers see the metrics and bids of all Buyers). Depending upon the parties preferences, the Bidding Process may be conducted automatically (IWS designates the winning bid as the highest earning per visitor to the Seller), or manually in which the Seller selects the winning bid based on factors considered by the Seller. The Seller and winning Buyer are then notified of the results of the Bidding Process by the IWS site.

When the Seller has accepted the winning bid, the parties enter the Sale Process in which the IWS establishes a link to send the Seller's click-through traffic to the winning Buyer's web site for the duration of the Sale. The IWS continues to measure the click-through traffic and displays the metrics so that both parties can continue to monitor the productivity of their relationship. If either party should become dissatisfied with continuing the relationship, it may terminate the Sale and re-enter the Trial and Bidding Processes with other parties.

With the links code pasted in the Seller's web site program, each time a visitor visits the web site during a trial, sale, or other transaction monitored by the IWS, the web site server will load the site's web page in the user's browser and fetch the file content for the Buyer's ad or banner from the IWS JS file address to which the links code points for display in the links area on the Seller's web site page. An example of the links code is shown in FIG. 10. The JS file is set up with initial content for display on the Seller's web site when the seller has registered with the IWS to sell its click-through traffic. A sample of an initial JS file is given below:
>:document.writeln (CLICK HERE FOR CONNECTION VIA CLICKSBROKER; WE CAN LINK YOU TO A RECOMMENDED VENDOR OF INTEGRATED KIOSKS.');

When a trial or sale is established to a buyer's web site, the initial content of the JS file is overwritten with the buyer's link content, which is then displayed on the Seller's web site through the Seller's link to the IWS. When the visitor to the Seller's web site clicks on the links area, a click-through message is sent to the IWS, and the visitor is then redirected to the Buyer's web site. Similarly, when the Buyer's web site program loads the web page for the visitor, it executes the IWS code page embedded by the Buyer, and enables the visitor's movements around the Buyer's web site to be tracked with click messages sent to the IWS. The IWS program has a tracking component that tracks and records the transaction ID, time, and address of all messages sent to the IWS by participating web sites.

Using the facilities provided by the IWS, Sellers and Buyers can conduct online transactions for buying and selling click-through traffic based on real-time information for informed decision-making and choosing the best price in relation to the quality of click-through traffic offered. The time for parties to find each other, and to try out, bid, and contract for click-through traffic can be greatly shortened and expedited. Buyers can enter into multiple trial processes to assess which Sellers' web site(s) are most compatible with theirs. Sellers can obtain the best returns for their click-through traffic from among buyers bidding through the bidding process. After a sale is concluded, the IWS monitoring of the click-through traffic allows Buyers and Sellers to be continuously apprised of the productivity of their advertising/linking relationships, and can easily terminate them and re-enter new bidding processes via the Intermediary Web Site.

Figure 2:
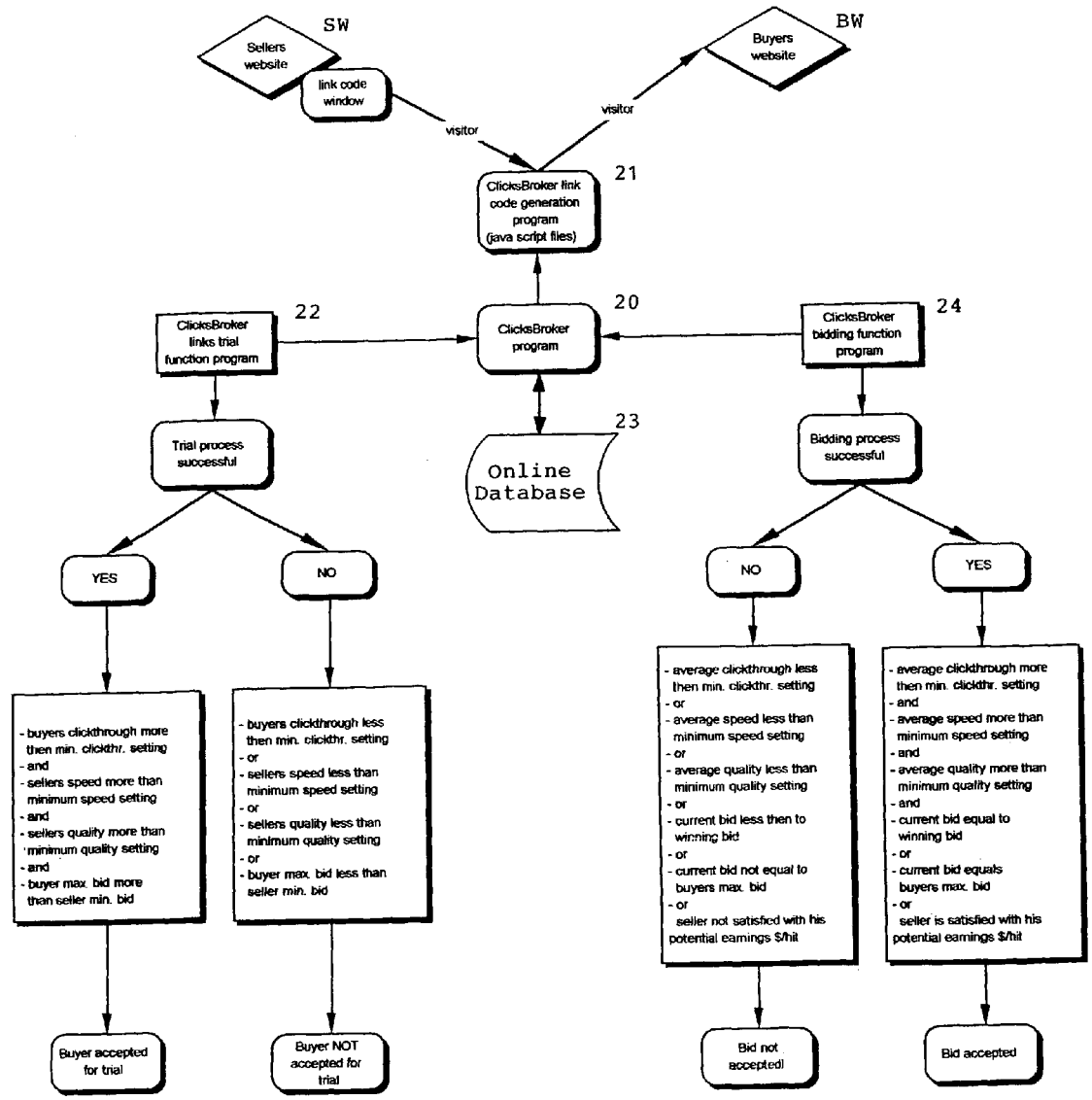
FIG. 2 is a process diagram illustrates the trial process and the bidding process performed by the Intermediary Web Site program.

In FIG. 2, a more detailed description of the process flow and functional steps performed by the preferred implementation of the invention is provided. The Intermediary Web Site is referred to hereafter as the "ClicksBroker" site or program 20. When the Buyers and Sellers have registered and a Seller has offered its click-through traffic for sale, the ClicksBroker program 20 enables the ClicksBroker links trial function program 22 to set up the Trial Process. If the setting up of the Trial Process is successful ("Yes"), it means that the Buyer has indicated minimums for delivery speed and/or quality level and a maximum bid that are met by the preferences for the Trial Process input by the Seller. If the minimum preferences of the parties are not met ("No"), then the Buyer is not accepted for the Trial Process. The ClicksBroker program can then conduct the Trial Process with the Buyers accepted by the Seller. For each accepted Buyer during the Trial Process, the ClicksBroker program 20 enables the link code generation program 21 to write Java script files which are used to link traffic coming from the Seller's web site SW to ClicksBroker and on to each Buyer's web site BW in turn. The ClicksBroker program monitors the traffic sent from the Seller to each Buyer and stores the data in the ClicksBroker database 23.

When the Trial Process has been completed, the ClicksBroker program 20 enables the ClicksBroker bidding function program 24 to conduct the Bidding Process. A successful Bidding Process ("Yes") means that the average of click-through ratio and/or quality actually received by the Buyer in the Trial Process have met the parties' requirements, and that the Buyer's bid is the highest bid or is the Buyer's maximum bid or is otherwise satisfactory to the Seller, so that the Buyer bid is accepted as the winning bid. If the minimum requirements of the parties are not met ("No"), then the Buyer is not accepted as the winning bid.

Figure 2A:
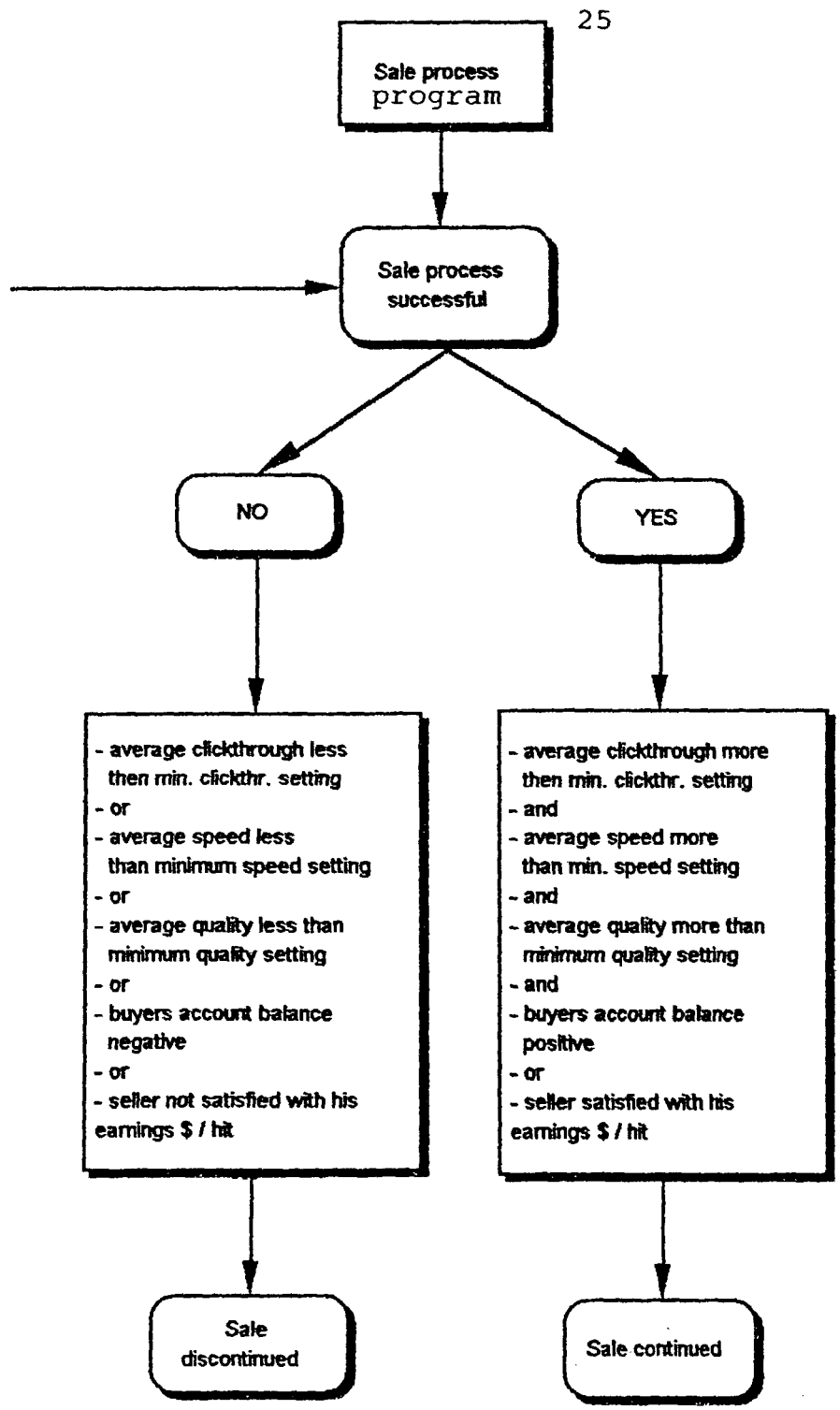
FIG. 2A illustrates the sale process.

In FIG. 2A, when the Bidding Process has resulted in the Seller's acceptance of the winning bid, the ClicksBroker program 20 enables the ClicksBroker sale process program 25 to monitor the sending of click-through traffic from the Seller's web site through ClicksBroker to the winning Buyer's web site, and to display the ongoing metrics of the click-through traffic. A successful Sale Process ("Yes") means that the average of delivery speed and quality continuing to be received by the Buyer meet the Buyer's requirements, and that the Buyer is making satisfactory payment to the Seller or the earnings received by the Seller are otherwise satisfactory, so that the Sale Process will be continued. If the requirements of the parties are not met or either party is otherwise unsatisfied with the relationship ("No"), then the Sale process will be discontinued.

Figure 3:
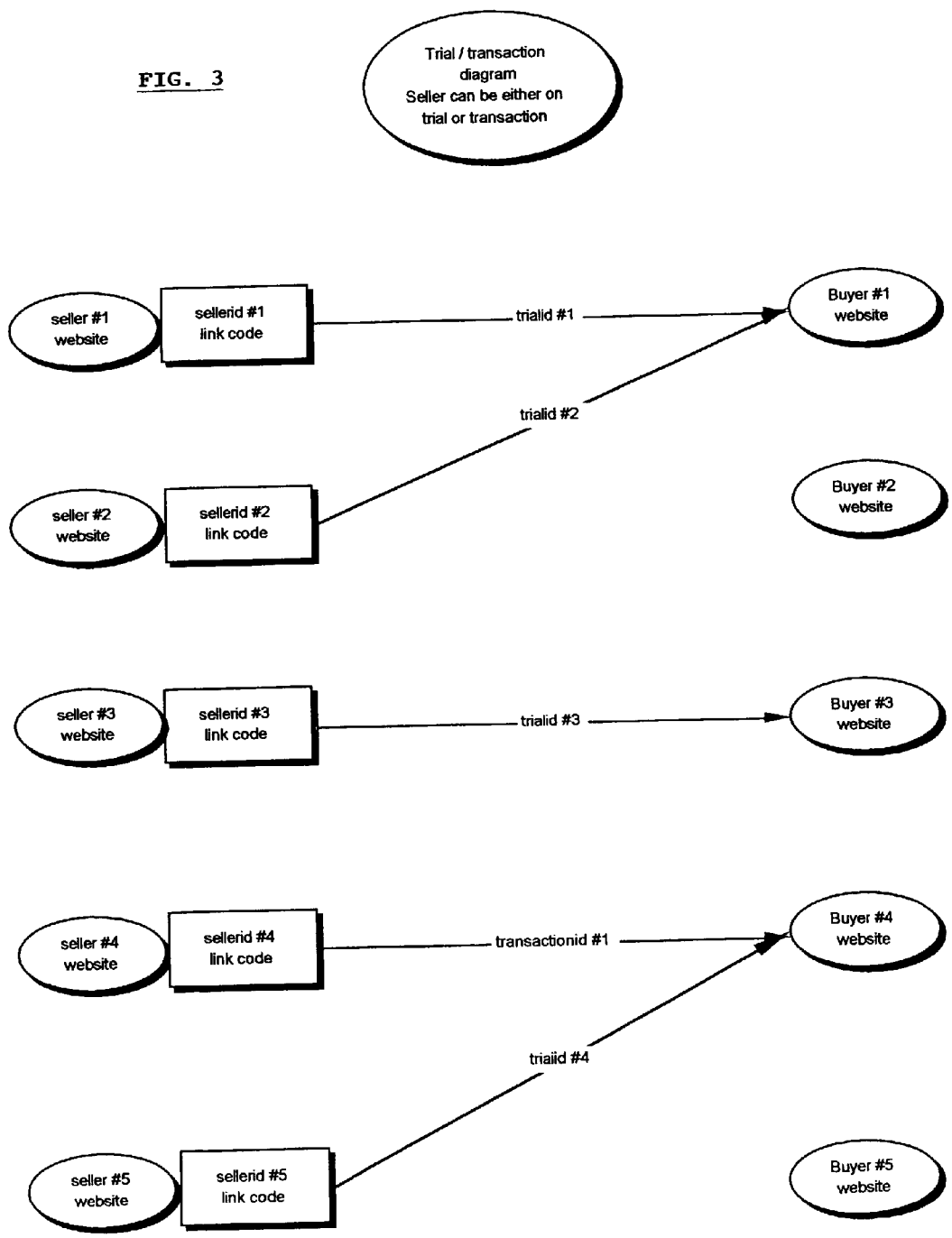
FIG. 3 illustrates different modes for buyers and sellers to engage in trial, bidding and sale processes.

FIG. 3 illustrates several different modes in which Sellers and Buyers can engage in the Trial/Bidding and Sales Processes. A Buyer (#1) can engage in multiple Trial Processes (trialid#1, trialid#2) with different Sellers (#1, #2). A Seller (#3) can conduct a Trial Process (trialid#3) with one particular Buyer (#3). A Buyer (#4) can be engaged in a Sales Process (transactionid#1) with one Seller (#4), while participating in another Trial Process (trialid#4) with another Seller (#5), while other Buyers (#5) can remain in the IWS database but not participate in any ongoing processes.

Sellers Registration Process

After entering personal information, login information and website information, the Seller chooses a textual link display style, including font: (type, color, size), and label: (width, background color, padding and border). After viewing the link, if satisfied, the Seller is redirected to a page to copy out a links code to paste on pages where the links will be displayed. During an initial pre-qualification stage, the links point to ClicksBroker and send a given number of clicks, e.g., 20 clicks or 20 unique visitors. During this time, the visitor traffic and other parameters are measured. After this stage, ClicksBroker notifies the qualified Seller that it is ready for the next step to go on trials with selected buyers. If the website traffic appears low (below 500 visitors per day), the Seller may be recommended to sell the click-through traffic directly to a buyer (no trials).

Trial Process for Sellers

If the Seller chooses trials, it is first given a choice to set bidding preferences, such as the minimum required click-through ratio (number of visitor clicks per number of link impressions served), the minimum acceptable bid (lowest price per click Seller is willing to accept), maximum bid (for limiting the number of selectable buyers), bidding length, and auto/manual bidding choice. The Seller is then given a list of Buyers registered with ClicksBroker that meet the Seller's requirements and have chosen to participate in trials. The Buyers recommended to Seller are selected to have bidding preferences that reflect the Seller's parameters for visitor traffic and bidding preferences. The more visitors a Seller has, the more the Seller can demand for his click-through traffic. The system allows the Seller to choose a predetermined limit, say up to 10, buyers for a trial at any one time. Once the Seller chooses them and starts the trial process, each Buyer's link is established by ClicksBroker and maintained for a given period or amount of clicks, for example, until the Seller delivers 20 clicks to each Buyer. It is important to note that, in the basic mode of operation, the Seller can only deliver click-through traffic to one Buyer's website at a time during trials. (There are 3 modes for delivery of clicks from a Seller, i.e., to ClicksBroker at the pre-qualification stage and intermediary stages, to a trial partner during a trial period, or to a sale transaction partner after one is selected as the winning bidder). Once the trials are over, the Seller is ready for the bidding process.

Automated Trial Process for Sellers

The Seller can also choose to have his trial process conducted automatically or manually. In the automatic mode, the trial process would start immediately after the Seller has been qualified by ClicksBroker and the website traffic patterns have been confirmed by ClicksBroker. Up to 10 Buyers are automatically selected by ClicksBroker by matching their minimums to the Seller's visitor traffic and bidding preference settings. The Buyers selected are those that have websites that fit into the Seller's maximum/minimum bid range and click-through ratio (in that category). If the Seller chooses, the whole process from registration to sale transaction can be conducted automatically without the need for the Seller's intervention.

The Bidding Process for Sellers

At the beginning of the Bidding Process, all Buyers that have ever had a trial with the Seller are notified by e-mail and can view a new table at their bidding page on the ClicksBroker site where the Seller's website is listed as available for bidding. If the Seller has chosen auto-bidding, then the bidding will start automatically if any of the Buyers that participated in the trials earlier also elected the auto-bidding mode. The bidding starts automatically with the Seller's minimum bid amount entered automatically for the Buyer(s) who elected auto-bidding. Otherwise, the Seller can initiate the bidding process and wait for the first Buyer to enter a bid. During the Bidding Process, the Seller is presented with the current results of the bidding process. After the bidding process is over (the length is set by Seller as a bidding preference), the Seller is notified and displayed a table with the bidding results. He can choose a sale transaction partner not only by who offered the highest bid per click-through, but also by how much will the Seller stands to earn per impression served from the website. Thus, a Seller may choose the Buyer who has a lower price per-click offer but a higher click-through ratio, and thereby earn more than if the Seller had chosen a higher price per click. Once the Seller has decided on the most profitable relationship, the Sale Process can begin.

Automated Bidding Process for Sellers

If the Seller elected the automated bidding process, then the bidding would start automatically after the last of the Buyers' trials is over. A winning Buyer would be selected automatically according to which offered the highest earnings per impression, i.e., the best combination of click-through ratio and price per click. The Sale Process would then start immediately.

Sale Process for Sellers

During the Sale Process, ClicksBroker monitors the click-through traffic between a Seller and the winning Buyer. The Seller and Buyer can both see the results of the click-through traffic and monitor the click-through ratio, traffic quality, and number of clicks delivered. At any moment, if either party is not satisfied with the Sale Process, that party can choose to stop the sale. The relationship between the Seller and a clicks Buyer on the Intermediate Web Site is thus a dynamic process where the parameters may change in real time and the parties can elect to continue or terminate the sale. This ensures that the relationship remains successful only as long as both the Seller and Buyer are satisfied at every moment of the process. The parties can then decide to re-enter the trial/bidding process or offer/bid for clicks (links) on a direct sale basis.

Automated Sale Process for Sellers

The Seller can have the sale stopped automatically if the selling relationship with the Buyer falls short of the Seller's requirements. For example, if the click-through ratio during the sale process goes down more than the minimum click-through ratio setting, e.g., 30% for period of more than a week, then the sale would be terminated immediately. The Seller and Buyer would be automatically notified by ClicksBroker. Either party may then re-enter the trial and bidding process in search for a better relationship.

Direct Sale Process for Sellers

ClicksBroker can offer Sellers the option of electing the Direct Sale process which is more suitable for sites with small visitor traffic, where going to trials with many buyers may be impractical. Also, if the Seller wants to sell its click-through traffic fast and bypass the trial and bidding process, then Direct Sale may be preferred. In the Direct Sale, the Sellers list their website traffic parameters and their price/click requirement, and interested Buyers can choose the Seller(s) they feel offer the most profitable matches, and start the sale process immediately.

Buyers Registration Process

After entering personal information, login information, website information and how much click-through traffic is desired, the Buyer submits the advertising or banner display content to ClicksBroker. For example, the Buyer can enter two textual titles and descriptions of the website and up to three banner links of various sizes. Then, the Buyer is given a tracking code to paste on the clicks-receiving pages. After the code is pasted on the Buyer's pages, the Buyer must verify the links with ClicksBroker to activate the account. Once the account is activated, the Buyer can select bidding preferences, such as minimum required traffic quality (page hits per unique visitors multiplied by time spent per unique visitor), required clicks per day delivery, minimum bid (used to limit the number of sellers), maximum bid (the highest amount per click willing to pay) and auto/manual bidding choice. Settings are recommended according to the click-through traffic the Buyer is looking to buy. The more clicks the Buyer is willing to buy, the better deal the Buyer can expect from Sellers who are looking to sell more clicks. The last step in the registration process is for the Buyer to make an initial deposit or credit card charge authorization for payment in a sale transaction.

Trial Process for Buyers

At the beginning of a Trial Process, the Buyer is offered a choice of Sellers with which to participate in trials. The Sellers are selected according to the Buyer's bidding preferences for the best seller matches in the Buyer's category, such as min/max bidding range and minimum required traffic quality. The Buyer can choose to ask one or more Sellers for trial. A Trial Process can be started with each Seller that accepts the Buyer. The Buyer can wait for trials to come through, or may also search for direct sale partners and start a sales transaction immediately. The Buyer can have as many simultaneous trials, sale, or direct sale transactions as desired.

Automated Trial Process for Buyers

If the Buyer elects the automatic mode, ClicksBroker will select the Sellers (who also elected the automatic trial option) in the Buyer's category that fit the min/max bid settings and minimum traffic quality requirements. The Sellers are notified by ClicksBroker automatically of the Buyer's participation in trials, and the Buyer is able to view the results of all trials and click-through traffic received on the webpage set up for the Buyer's account.

Buyers Bidding Process

As Sellers complete their trials, the Buyer would be invited to participate in the bidding process. The Buyer would then place any bids, and after the bidding process is over, would be selected by a Seller upon providing the best bid and match to the Seller's requirements.

Automated Bidding Process for Buyers

If the Buyer has chosen auto-bidding as his preference, then the Buyer's bids would be entered automatically in increments of one cent ($0.01) as necessary to be the highest bidder, until reaching the maximum bid set by the Buyer. The automatic bidding guarantees that the Buyer will not lose in the bidding through oversight, as long as the current bid is lower than the maximum bid set in the Buyer's preferences. Once the bidding is over, the Buyer is chosen automatically if providing the best bid and match to the Seller's requirements. A Sale Process is then started by ClicksBroker between the sale partners automatically.

Buyers Sale Process

During the sale process, the Buyer can monitor the results of the sale in terms of traffic quality and number of clicks delivered. At any moment, if not satisfied with the sale process, the Buyer can choose to stop the sale. The relationship between the clicks Buyer and Seller on the Internet is thus made into a dynamic process where parameters involved may change in real time. The relationship can thus be considered successful as long as both the Buyer and Seller remain satisfied.

Automated Sale Process for Buyers

If the Buyer chooses the automated sale process, the Buyer's purchase transaction is stopped automatically if the relationship with the Seller falls short of the Buyer's requirements set in the Buyer's preferences, e.g., if traffic quality goes down more than 30% from minimum traffic quality setting for period of more than a week.

Buyers Direct Sale Process

If in need of a great number of visitors, a Buyer can start any number of direct sale transactions (no trial or bidding involved). The Buyer only has to chose from the list of qualified Sellers provided by ClicksBroker who are offering their clicks for direct sale. After choosing one or more direct sale Sellers, the sale process is started. The direct sale can be stopped at any moment if either party is not satisfied with the relationship.

Example of an Intermediary Web Site Program

An Intermediary Web Site program was built using the Microsoft VisualStudio.net development environment and particularly its ASP.NET feature, with VisualBasic.net as the programming language. The IWS database was built on Microsoft SQL Server 2000 and contained 35 different tables where data is stored during the ClicksBroker processes.

User interfaces were constructed as asp.net web pages (extension .aspx) and business logic was performed using a number of VisualBasic.net components and classes (extension .vb) that manipulate data inputted by users and stored in the database or retrieved from the database and displayed to users. Each database table had a component that worked as an interface between the program and the database and set the parameters for SQL stored procedures (over 150 of them) that performed all of the database functions.

The tracking of click-through traffic was maintained as a global.aspx file where server variables are retrieved for every user session. Using advanced ASP.net tracking features and request string passed by ClicksBroker member websites links, each hit, click, page viewed, and the time viewed was recorded in the database logs tables. The request string is part of the ClicksBroker code that Sellers and Buyers paste on their websites. For example, the links code can have 12 digits where if the first character is "1", the link is sending to the ClicksBroker web site, and if it is "2", then the link is sending traffic to trial partners, and if it is "3", then the link is sending to a sale transaction partner.

The minimum required parameters for click-through traffic were recorded: hit (link impression on sellers link); click (click on the seller link); pages (number of pages viewed on the buyers website); and time-spent (viewing buyers pages). This allowed computation of the seller's click-through ratio as hits/clicks, the seller's traffic quality as hits*time-spent/ clicks, the clicks per day or speed of delivery, the seller's real earnings as $/hit, and other important parameters that define the seller/buyer relationship.

Links were automatically served using simple Java Script (compatible with all browsers) and specifically by creating a small Java Script (extension .js) file in the ClicksBroker links directory for each link on the seller's website. The seller's link pointed to that particular JS file and, if the buyer is changed, the content of that JS file is over-written by information from the new buyer taken from the database. The file held the content of the buyer's ad messages and, more importantly, the relationship (trial or transaction) id number in the form of a request string added to the buyer's link. The relationship id was a 12 digit number that corresponds to a particular database table, such as: (1) affiliateid in an affiliate table; (2) trialid in a trial table; or (3) transactionid in a transaction table. The relationship id thus identifies the seller/buyer relationship as affiliate, trial or sale transaction.

A detailed outline of program components in the example of the Intermediary Web Site (ClicksBroker) is appended hereto as Appendix 1.

A program listing of the tracking component used for tracking metrics of the click-through traffic sent from a Seller's web site to a Buyer's web site is appended hereto as Appendix 2.

Figure 4:
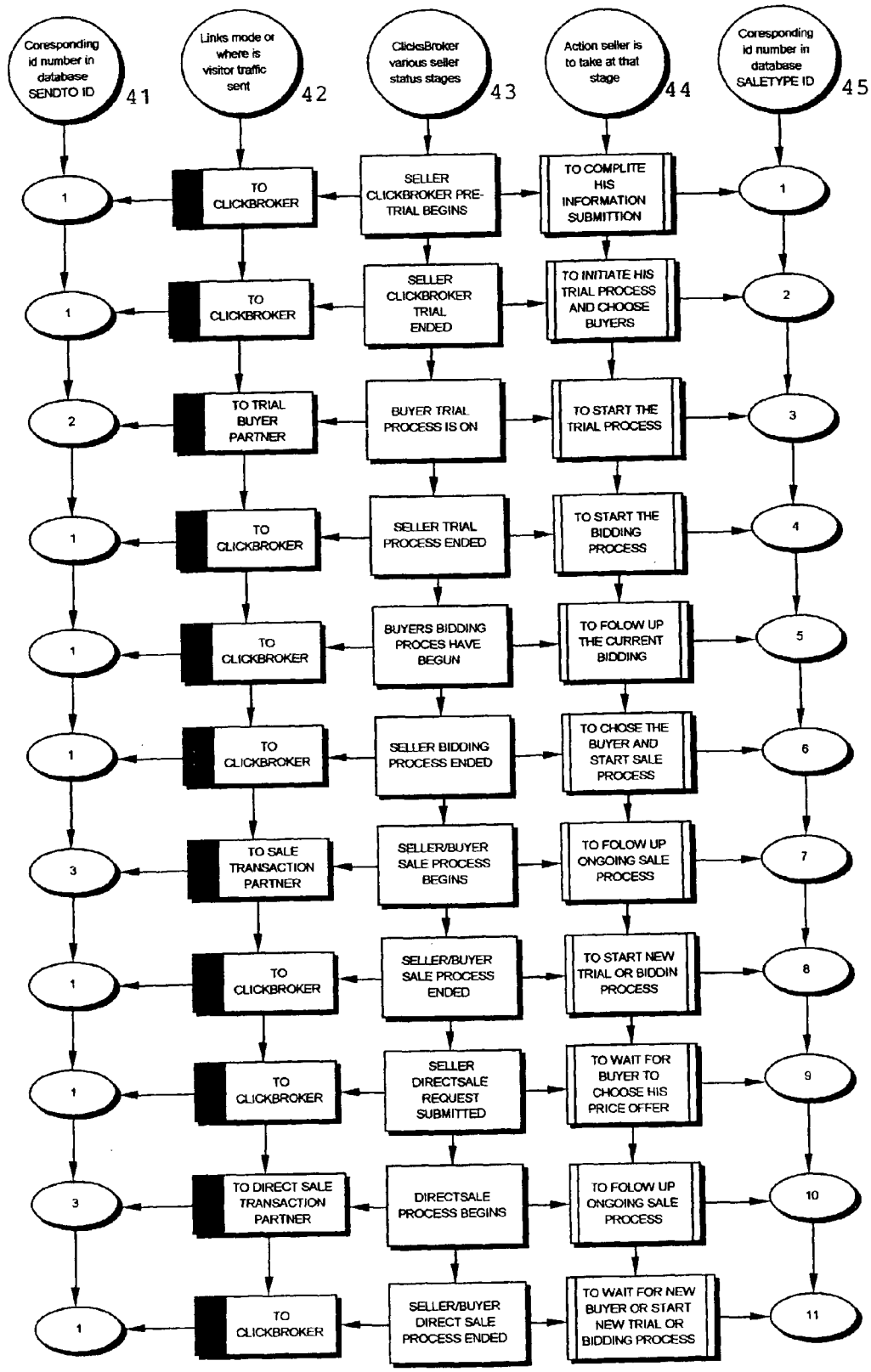
FIG. 4 is a state diagram for processes performed in the Intermediary Web Site program.

FIG. 4 is a state diagram illustrating the processes going on in the above-described implementation example of the ClicksBroker program. Column 45 indicates the corresponding id number in the database for each type of process stage (Type 1 to Type 11), referred to as "SALETYPE ID". Column 44 indicates the action the seller is taking at each type of process stage. Column 43 indicates the status of the various Sellers or Buyers at each process stage within the ClicksBroker program. Column 42 indicates the links mode or where the traffic is sent at each process stage. Column 41 indicates the corresponding datatype id number in the ClicksBroker database addressed by the program.

For example, in process stage Type 1, the Seller is to complete the submission of information, ClicksBroker is engaged in pre-trial qualification of the Seller, the focus of transaction is at ClicksBroker, and the datatype id number is indicated as "1" (data collection and storage). In Type 2, the Seller is to initiate a Trial Process and choose Buyers, Clicks- Broker has completed pre-trial qualification of the Seller, the focus of transaction is at ClicksBroker, and the datatype id number is indicated as "1". In Type 3, the Trial Process is started, ClicksBroker is conducting a trial with each Buyer, the focus of transaction is at the Buyer, and the datatype id number is indicated as "2" (providing/storing data to/from an external entity). In Type 4, the Seller is starting the Bidding Process, ClicksBroker has completed the Trial Process with the Buyers, the focus of transaction is at ClicksBroker, and the datatype id number is indicated as "1". In Type 5, the Bidding Process is underway, ClicksBroker is displaying information to the Buyers and receiving their input, the focus of transaction is at ClicksBroker, and the datatype id number is indicated as "1". In Type 6, the Seller is choosing the winning bid, ClicksBroker has completed the Bidding Process, the focus of transaction is at ClicksBroker, and the datatype id number is indicated as "1". In Type 7, the Sale Process is underway, ClicksBroker is monitoring traffic between the Seller and winning Buyer, the focus of transaction is at the Sale transaction partners, and the datatype id number is indicated as "3" (data collection/storage from monitoring external entities). In Type 8, a new Trial or Bidding Process is to be started, ClicksBroker has ended a Sale process, the focus of transaction is again at ClicksBroker, and the datatype id number is indicated as "1".

As an alternative to Trial/Bidding with a number of interested Buyers, a Seller can conduct a Sale Process (without trial or bidding) with one chosen Buyer, and conduct a negotiation directly (manually) with the Buyer. In Type 9, the Seller initiates a Direct Sale, ClicksBroker sets up the Direct Sale process, the focus of transaction is again at ClicksBroker, and the datatype id number is indicated as "1". In Type 10, the Seller engages in the Direct Sale with the Buyer, ClicksBroker conducts the Direct Sale Process, the focus of transaction is at the Direct Sale partner, and the datatype id number is indicated as "3". In Type 11, the Direct Sale is concluded, ClicksBroker has completed the Direct Sale process and can start a new process, the focus of transaction is at ClicksBroker, and the datatype id number is indicated as "1".

Figure 5:
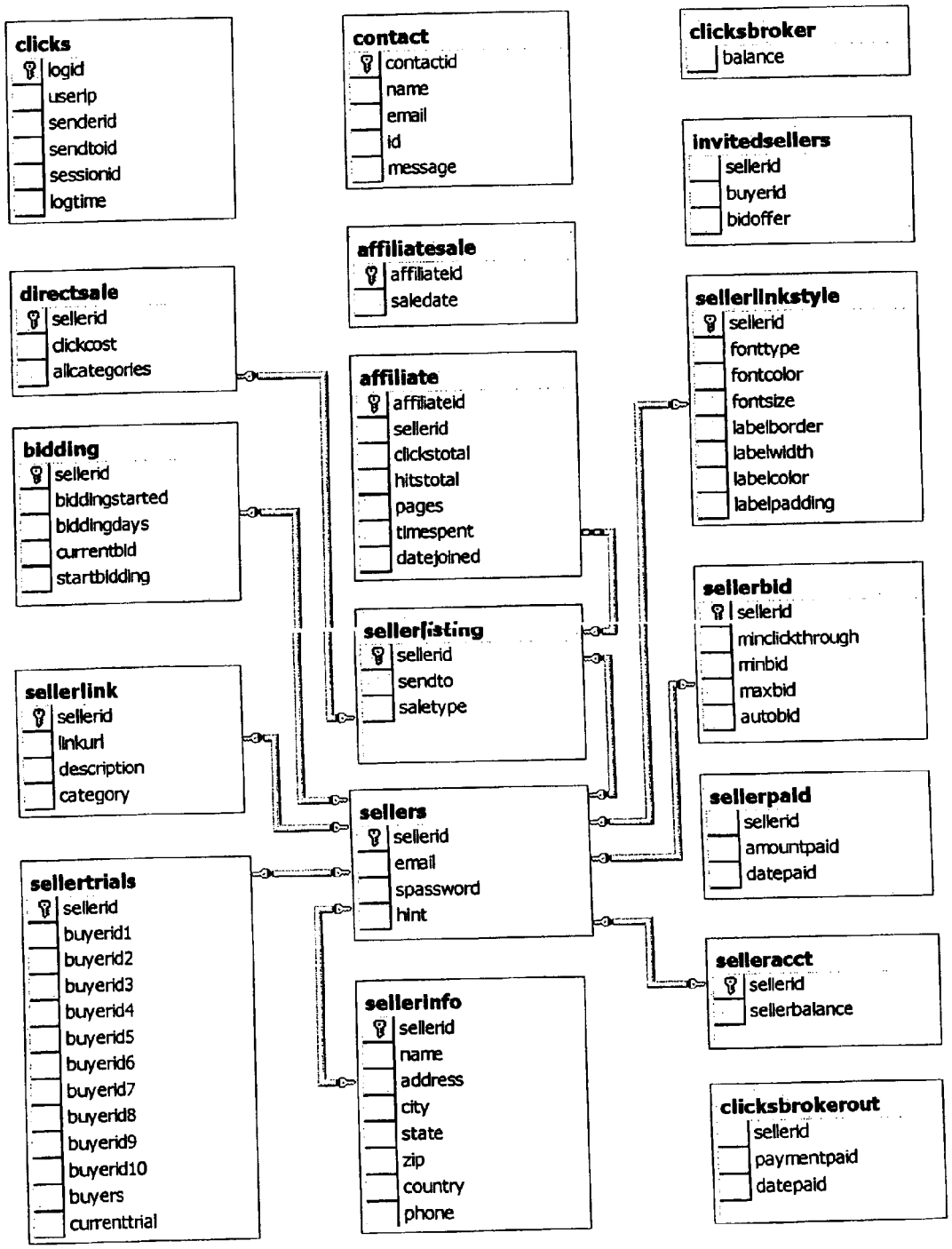
FIG. 5 illustrates the database indexing of Seller data.

FIG. 5 illustrates the database indexing of Seller data. The "sellers" data store the Seller's information for online usage, while "sellerinfo" stores other offline information. The "sellerlinkstyle" data store the Seller's preferred style of links display, and "sellerbid" store the Seller's expected minimum click-throughs and minimum and maximum bids that would be considered or election of automatic selection of highest bid. The "sellertrials" data store the record of trials engaged by the Seller, and "bidding" store the record of bidding engaged by the Seller. The "sellerlisting" stores records of current Seller's status, and "sellerlink" stores data on the Seller's web site. The "selleracct" data maintain the Seller's account balance. The "clicks" data record the history of Buyers' users sessions with the ClicksBroker site, and other housekeeping data records are also indicated.

Figure 6:
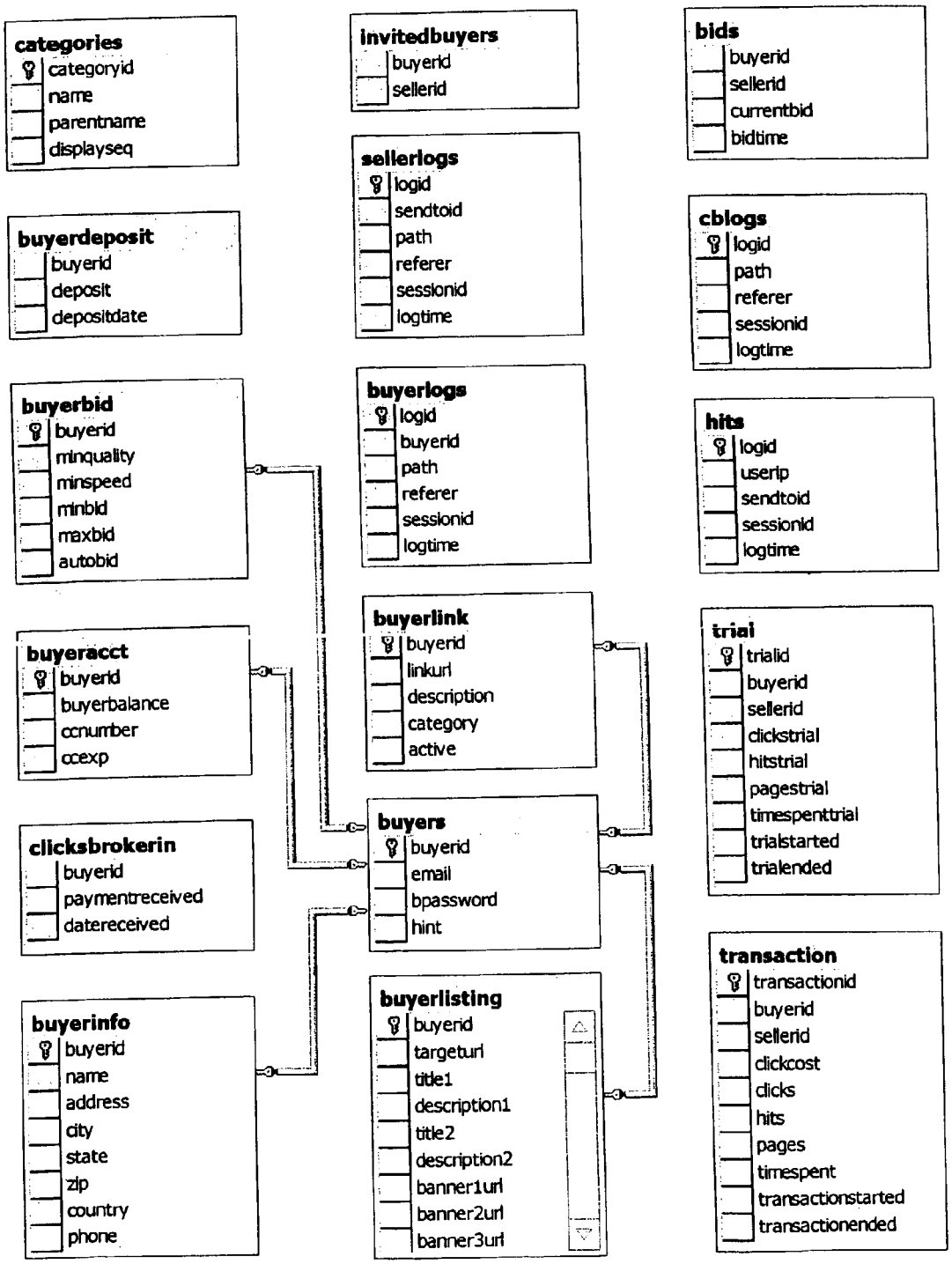
FIG. 6 illustrates the database indexing of Buyer data.

FIG. 6 illustrates the database indexing of Buyer data. The "buyers" data store the Buyer's information for online usage, while "buyerinfo" store other offline information. The "buyerlisting" data store the Buyer's content for approved links displays, and "buyerbid" store the Buyer's requirements for minimum click-throughs, speed, and quality, and minimum and maximum bids that would be made or election of automatically making a highest bid. The "bids" data store the bids made by the Buyer, "cblogs" store records of the Buyer's sessions online with ClicksBroker, and "hits" stores the record of Seller's users sessions with ClicksBroker. The "trials" data store records of the Buyer's participation in trials, and "transaction" store records of the Buyer's participation in transactions. The "buyerlink" stores the Buyer's web site information. The "buyeracct" maintains the Buyer's account balance and credit account information. The "clicksbrokerin" records the history of Buyer's payments to ClicksBroker, and other housekeeping data records are also indicated.

Exchange Partner Program

Figure 7:
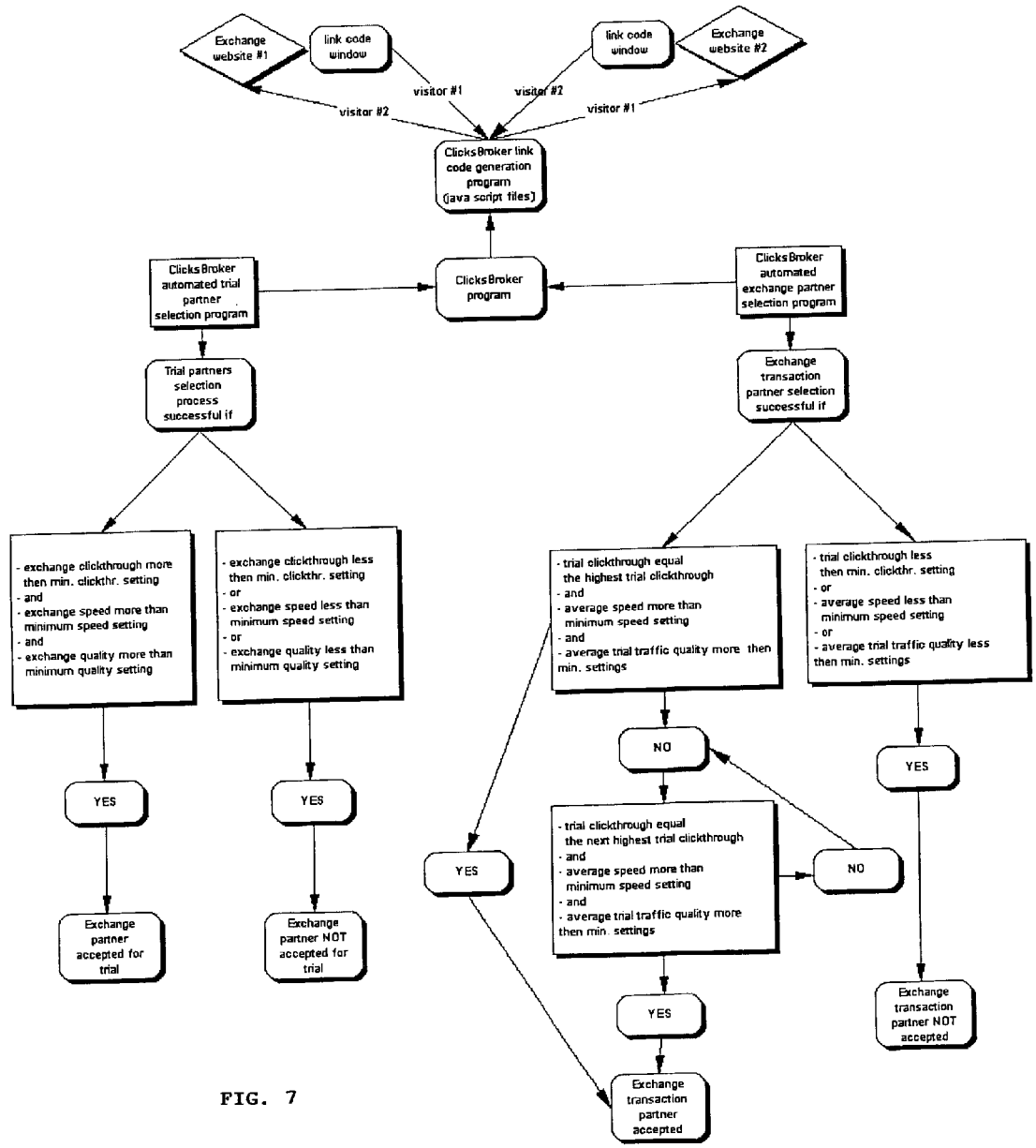
FIG. 7 is a schematic illustration of an improvement to the present system allowing buyers and sellers to engage in trial, bidding and sale processes for each other's click-through traffic as exchange partners.

In FIG. 7, an improvement to the present system is shown which allows buyers and sellers to engage in trial, bidding and sale processes for each other's click-through traffic as exchange partners. The Exchange Partner program works in the same way as the buyer/seller process except that the buyer is defined as a clicks-Receiver and the seller is defined as a clicks-Sender. The exchange partners are each clicks-Senders and clicks-Receivers in two mutual relationships. There are two trial IDs involved (Exchange website #1 and Exchange website #2) with corresponding link codes.

Similar to the trial process described previously, the ClicksBroker program first conducts a trial partner selection process for exchange partners to be accepted for trial, then conducts an automated trial process for the exchange partners to try out a relationship with each other. The exchange trial between each clicks-Sender and clicks-Receiver is recorded. The results of the exchange trials are compared with metrics for the exchange parameters that inform the exchange participants of the success of their interaction. The ClicksBroker program can then conduct a bidding process where the exchange participants can bid for click-through traffic from the exchange partner's web site. Based on the bidding process, the best matched exchange partners can establish an exchange relationship in which mutual click-through traffic is exchanged between the exchange partners' web sites. These processes are described in further detail below.

Exchange Member Application Process

After entering personal information, login information and website information, the exchange partner chooses a textual link display style, font (type, color, size), and display appearance of the link (width, background color, padding and border). The exchange partner is then redirected to a page to obtain a ClicksBroker links code to paste on the website pages where the links will be displayed. Then the exchange partner inputs the advertising messages information, such as textual titles and descriptions of the website and banner links. After that, the exchange partner is given a tracking code to paste on the clicks receiving pages. At this stage, the exchange partner's click-throughs are sent to ClicksBroker for the qualifying number of clicks, such as until 20 visitors are sent (pre-trial). During this time visitor traffic and other parameters are measured.

Exchange Trial Process

First, the exchange partner sets exchange preferences, such as minimum required click-through ratio (number of visitor clicks per number of link impressions served), minimum required traffic quality (number of pages visited multiplied by time spent per user session), and auto/manual exchange choice. As the clicks-sending part of the exchange relationship, the clicks-Sender is given a list of other exchange partner websites recommended by ClicksBroker to choose for trials. The sites recommended to the exchange partner have exchange preferences that appropriately match the clicks-Sender's profile of visitor traffic and exchange preferences. The more visitors the click-Sender has, the more the clicks-Sender can demand from an exchange partner (higher click-through ratio and higher traffic quality). The clicks-Sender can choose up to 10 clicks-Receivers websites for trial at a time. Once the clicks-Sender chooses them and starts the trial process, the chosen exchange website messages are displayed consecutively on each other exchange partner's site until the clicks-Sender has delivered 20 clicks to each of them. It is important to note that the clicks-Sender can only deliver clicks to one website at a time. As the clicks receiving part of the relationship, the clicks-Receiver is available for other trials with other exchange websites. The clicks-Receiver can have many simultaneous trials at the same time.

Automated Exchange Trial Process

The exchange partner can also choose to have the trial process automated. The trial process would start immediately at the end of the pre-trial with ClicksBroker. The program would then select the top ten exchange websites according to the visitor traffic and the exchange preference settings. The websites that would be selected are the ones that have the highest click-through ratio and traffic quality record, and fall into the specified traffic (number of visitors per day) category. If the user chooses the "auto mode", the whole process from submission to exchange transaction can go on without the need for intervention and the best possible match is automatically selected.

Exchange Website Selection Process

The exchange partner can choose another exchange partner by the highest click-through rate, and the highest traffic quality. As the clicks receiving website, the clicks-Receiver is concerned with traffic quality received. The clicks-Sender is concerned with the click-through ratio. Once the partners have selected each other as the most profitable relationship, the click-through exchange relationship can begin. The selection process could be automated so that ClicksBroker program chooses the exchange partner that had the most effective relationship (highest click-through rate).

Exchange Relationship Process

During the exchange relationship process, the exchange partners can see the results of the exchange and monitor the exchange relationship parameters (click-through ratio, traffic quality and number of clicks sent and received) through the ClicksBroker website. At any moment, if not satisfied with the exchange relationship, either exchange partner can stop the exchange. The relationship between clicks exchange websites is a dynamic process where the parameters involved may change at any moment. The exchange relationship is successful as long as both Sender and Receiver websites are satisfied at every moment of the process The user can have the clicks exchange stopped automatically if the relationship with the other exchange website falls short of expectations. For example, if the click-through rate goes down more than 30% (from the minimum click-through rate setting) for period of more than a week, the exchange relationship may be stopped. Also, if traffic quality during the exchange process goes down more than 30% (from the minimum traffic quality setting) for a period of more than a week, the exchange process may be stopped.

Other Improvement Features and Variations

The above-described trial, bidding, and sale/exchange relationship processes provide the core functions of the invention system. Many other variations and improvements may of course be adapted to the system. For example, improvements which may be made to the Clicks Broker website or its functions include the following:

1) Floating Ads, Full-Page Ads, Pop-Up Ads, Pop-Under Ads, and Rich Media Ads.

To implement them would require just adding appropriate code (Java Script) to call the specific programmatic function required. Their purpose is to attract user attention as they are presented in a separate browser window. Since ClicksBroker is using Java Script to display links on seller sites, any of ad delivery methods above can be easily implemented and are compatible with the majority of browsers.

2) Opt-in Email Forms to Collect User Data Instead of Click-Through.

This could be treated as a pay-per-lead method instead of pay-per-click. If the buyer wants to collect an opt-in mailing list instead of getting visitors, it would be easy to implement a new payment system where the seller will be paid per new user signed for the mailing list. Tracking of submissions (leads) is accomplished by pasting tracking code on the thank-you page (the one that opens after the user submits the form). The thank-you page could be served by ClicksBroker, which would make it easy to automate pasting of the necessary tracking code. The new payment system (per lead) would require creation of a new column in the trial and transaction tables that would tell the program what is the current payment method (per click or per lead) for a particular buyer.

3) Buyer Offers Combination of Text and Images in Full-Page Ad.

Since the ClicksBroker program is generating displayed link HTML automatically by calling buyers ad messages from the database, it would be easy to create a whole page display (full page ad). A number of full-page ad templates could be established and sellers could choose the ones they like most. A full page display would open as a new browser window (whole Web page served as an ad instead of just a link or banner).

4) Streaming Media (Video Ads).

As high bandwidth Internet connections become more available to the average user, streaming media ads will play a much more important role in Web advertising. ClicksBroker can implement it easily and the code in JS file can be created to call a streaming application. This promises the highest click-through rate of all other methods.

5) 3D Ads Using X3D Virtual Reality Standard (VRML).

3D content could be served when the user clicks on the seller's link (banner). Using VRML markup language instead of classic HTML, the ClicksBroker program would write VRML code into the JS file (that display the links). Browsers such as Microsoft IE and Netscape will have the X3D standard and serving 3D ads will become common.

6) Flash Ads, Using Interactive Features to Access Database.

As with 3D ads, flash animations can be served when a user clicks on the seller's link. New advanced features of flash format could be also used as the interface to connect to the ClicksBroker database, and provide interactive features for the user. Since flash animation use a vector format to compress data, much more sophisticated ad presentations can be used. High bandwidth Internet connection availability will make them common.

7) XML Or Web Services Using Soap Protocol To add interactive features.

Web services promise greater inter-operability between Web sites as compared to using only HTML for exchange through a request-response process. ClicksBroker can use Web services to enable its members (buyers and sellers) to exchange whole applications where the price-per-click model can be replaced by price-per-unit of data exchanged. Since Web services communicate with browsers using the XML standard (works with any software platform), easy connectivity with any user is assured. Since the ClicksBroker website is built on Microsoft's .NET framework, it would be easy to implement Web services by just calling its features within the framework.

8) User Specific Ad Serving for Big Buyers Who Can Offer Multiple Ad Messages.

Once database tracking per individual user is established, ads could be served depending on user profile (visitor's previously recorded browsing habits or behavior). A new table in the ClicksBroker database would collect user specific data, which later can be used to deliver ads customized per individual user preferences. The table would contain information on how long the user spent on pages categorized per particular user interests. For example, if the user has previously spent the longest time on the pages categorized for "Digital Cameras", then the user will be shown ad messages on "Digital Cameras" the next time visiting the seller's website.

9) Ads Are Changed on Effectiveness of Ad Message or Per Ad Campaign.

Tracking the effectiveness of particular messages can be defined as the click-through rate multiplied by traffic quality (as defined previously). A new column on the ClicksBroker database table for the buyer's ad messages would contain data on the effectiveness parameter for every ad. The most effective messages would be displayed after the initial trial was performed for all of the available messages. For example, all of the messages may be first served 30 times each and then the one with the highest effectiveness parameter is selected and displayed permanently. This applies the idea of trial testing to the ad selection process.

10) Mobile ads for mobile Web browsing (using .Net features).

Since the ClicksBroker website is built on Microsoft's .Net framework, it would be easy to implement mobile Web page ads using the Microsoft .NET framework. One of the strongest features of NET is its compatibility with mobile Web.

11) Mouse Over Click-Able Pop-Up Link Ads (Textual Links).

Textual links could contain a buyer messages and each would have a pop-up ad (opened in a new window) giving a more detailed description on the buyer's offering. The links are made part of the seller's page, and customized to have the same format (font, color, size . . . ) as the seller's page. When the user goes over the textual link with the mouse, the pop-up ad is activated. The pop-up ad may use the same text format as the link, or be in the format of the seller's choice. The seller would have to install part of the Java Script and the rest of the pop-up menu code could be served through the ClicksBroker JS file that would contain the rest of the script. The idea is similar to rich-media mouse-over ads by Point-Roll. However, as distinct from making the ads as different from the advertiser's (seller's) page as possible, the goal here is to be unobtrusive and to blend in the advertising links (and pop-up ads) with other textual links on the seller's page. The seller could accomplish that manually, or the ClicksBroker program could fetch the seller's page before it serves the link, analyze surrounding text, and serve the link text (and pop-up ad) in the same format as the surrounding text.

12) Customized Seller's Link Bar.

Different templates could be offered in various colors or shapes. The seller can use or customize the link bar to blend into the seller's Web page.

Improvements may also be made to the services provided by the Clicks Broker website to its users, including the following:

1) Intelligent Ads or Predicting the Most Effective Ads for Particular User.

The ClicksBroker program can collect data on individual users and track their behavior in regard to ad effectiveness (click-through rate times traffic quality). The ClicksBroker program can use the data to predict user behavior for ads of similar content. It can accomplish this by analyzing the category the ad belongs to, and the main keywords that the particular ad contains. It may compare keywords for specific category (for ads that have the best ad effectiveness track record) with new and untested ads (in the same category that contain the same keywords). The new and untested ads would be selected as most likely to produce positive results with the certain user (high effectiveness parameter). AI (Artificial Intelligence) methods may be used to predict user behavior and adopt the optimal link delivery methods.

2) Ad Delivery Optimized for Keyword Relevancy and Price Per Click (Hybrid).

For sellers who run their own search engines, ads could be served as result of the keyword search, for individual or multiple buyers. To better serve sellers with search engine websites, a ClicksBroker database search may be performed when user enters a keyword to search sellers database. The result (or results) displayed would be the combination of keyword relevancy and price-per-click. The seller would be given a choice to decide how much influence relevancy or price-per-click will have in the positioning of the buyers ads (% scaling).

3) Ads on Seller Site Served on Buyer's Campaign Timetable.

If a buyer has different ad campaigns, the buyer's ads could be served according to the ad campaign timetable. It would also be possible to track user response (ad effectiveness) of certain campaigns and perform quick trials to suggest to the buyer a different timetable for the ad campaigns.

Improvements may also be made to the ClicksBroker trial and bidding processes, such as the following:

1) Market Price Per Click as a Guiding Parameter.

If the number of buyers and sellers is big enough, ClicksBroker can use the market price per click as a guiding parameter depending on the other parameters (click-through, traffic quality).

2) Reliability Rating for Sellers Based on Parameters Fluctuations.

The seller's traffic quality and clicks delivery fluctuations may be used as a measure of the seller's reliability, so that the buyer would know whether the seller was more dependable than others. The reliability parameter can be expressed as % (percent), where 100% is best reliability and lower numbers accordingly for lesser reliability.

3) Allow The Buyer or Seller to Test the Look of Ads Before Choosing for Trial.

This would allow the seller or buyer to see how the other's messages (ads) would look on the Web site before choosing for a trial.

4) Automated Direct Sale Features.

A direct sale process can also be automated for buyers who require large quantities of clicks where many sellers can be chosen for a direct sale (no trial or bidding) using previously set guidelines on seller's traffic quality record and price-per-click. After the buyer sets the minimum/maximum price per click, required traffic quality, and number of clicks to buy, the ClicksBroker program can automatically start selling processes with sellers who best satisfy the minimum traffic quality and price-per-click. The number of sellers will be added on until the buyer's required clicks per day number is fulfilled. The direct seller can have the sale stopped automatically if the selling relationship with the buyer falls short of expectations. If the click-through ratio during the sale process goes down more than 30% (from the minimum click-through ratio setting) for period of more than a week, then the sale may be terminated immediately. Also, the direct buyer can have the purchase stopped automatically if the buying relationship with the seller falls short of expectations. For example, if traffic quality during the sale process goes down more than 30% (from minimum traffic quality setting) for period of more than a week, then the purchase may be terminated immediately.

5) Seller Recommend-it Window to Ad Link Visibility.

Displaying a new window on the seller's Web page above the buyer's ad message would tell the user that the seller recommends the link below. The seller can choose different templates for displays recommending the buyer's ad messages. The seller can also customize the recommend-it message to blend into the seller's Web page (or the program can serve the text format the same as the surrounding text). Since the seller is recommending the buyer's website, it may generate a much higher click-through rate.

6) Automated Banner Creation Using Templates and Net Drawing Features.

This would allow buyers to create banners (graphic images) using templates or let ClicksBroker create banners for them using predefined templates. It would enable buyers to offer greater variety of banners that can be tested during trial processes and discover which banners (with ad messages) produce the highest click-through ratio. Buyers would enter their advertising messages to be incorporated in the chosen banner image template. During trials, the banner images could be created on the fly (and would be deleted after serving), if there is a request for them on the seller's page. As different ad messages are tried (with a pre-selected banner template), the ones that produce the highest click-through rate would be selected. Once the sale process with a particular buyer is started, the banners (images) are created permanently using the highest producing ad messages and are served as permanent advertising banners.

7) Affiliate Model Based on Trial and Bidding Processes.

The trial and bidding processes can also be used to improve the effectiveness of the ClicksBroker Web site's affiliate program. Conventionally, affiliate members choose merchants to affiliate with by best guesses (manually). The current process is done by trial-and-error since the quality of the relationship is unknown until they have committed to the affiliate relationship. As with the ClicksBroker click-through sale process where best matches are found through the automated trial process, affiliate members (traffic senders) can find their best affiliate merchant matches (traffic receivers) on the ClicksBroker site through the trial process of interaction. Before they commit to a permanent affiliate relationship, the affiliate members can undergo trials and find their best matches. If affiliate merchants know in advance the quality of traffic coming from a particular affiliate member's website, the parties can go to the bidding process, since they would know what to expect from each other. Affiliate merchants would gladly pay more, per sale or lead or click, if the affiliate relationship quality can be tested and proven in advance. The parameters of affiliate relationship quality are: traffic quality for affiliate merchants and click-through rate for affiliate members. The affiliate relationship can also be stopped automatically if the relationship quality parameters prove unsatisfactory (same as in the ClicksBroker automated sale process).

8) Pay-Per-Banner-Impression Based on Trial and Bidding Processes.

The pay-per-impression model (CPM or per 1000 impressions) may be used instead of the pay-per-click model. Since ClicksBroker is already tracking records of the number of link (banner) impressions, it would be easy to establish a payment method based on pay-per-impression.

9) Second Bidder-Accepted Option if Relationship is Stopped.

If a sale relationship is stopped within a certain number of days, e.g., 7 days, the ClicksBroker program might automatically terminate and accept the second best-rated bidder in the previous bidding as the new sale partner. This feature would require the bidding results for every bidding to be recorded to identify the second bidder.

10) Price-Per-Click in Sale Relationship Made Dependent on Click-Through Parameters.

The price-per-click paid by the buyer may be made variable and adjusted when parameters of the sale relationship change. For example, the price-per-click can be made dependent on traffic quality, or of the number of clicks delivered, or of the number of click-throughs resulting in vendor sales. Different scales of dependency could be established for the buyer and the seller to choose from. The process could be automated so that for a higher price-per-click, a higher scale of adjustment is chosen (higher amplitude of adjustment).

It is to be understood that other many modifications and variations may be devised given the above description of the principles of the invention. It is intended that all such modifications and variations be considered as within the spirit and scope of this invention, as defined in the following claims.

The invention claimed is:

1. A method implemented on an online network connecting websites to computers of respective users for buying and selling of click-through traffic from a first exchange partner's web site comprising the steps of:
  (a) registering a plurality of exchange partners interested in buying click-through traffic of visitors from other exchange partners, wherein after the exchange partners have registered, a first exchange partner offers the click-through traffic from its web site for sale, and those of the other exchange partners interested in the first exchange partner's click-through traffic establish an exchange trial process to measure the click-through traffic that would be sent from the first exchange partner's web site to the web sites of each of the respective other exchange partners;
  (b) establishing a link from a first exchange partner's web site to an intermediary web site, and storing respective links to the plurality of other exchange partners' web sites at the intermediary web site, wherein the respective link to each respective other exchange partner's web site can be addressed through the intermediary web site by a corresponding exchange partner-specific link displayed on the first exchange partner's web site during a trial period to be conducted with each corresponding other exchange partner;
  (c) conducting a pre-bidding trial of click-through traffic from the first exchange partner's web site with the plurality of interested other exchange partners by linking the first exchange partner's web site through the intermediary web site to each interested other exchange partner's web site in turn during a given trial period so that each other exchange partner can assess what click-through traffic they will receive from the first exchange partner's web site;
  (d) conducting a bidding process after the trial period is concluded, in which the interested other exchange partners who participated in the pre-bidding trial can then bid a price each is willing to pay to obtain the click-through traffic from the first exchange partner's web site; and
  (e) enabling the first exchange partner to select a winning bid of an other exchange partner in the bidding process in order to conclude a sale of the right to obtain the click-through traffic from the first exchange partner's web site to the winning exchange partner's web site.

2. A method according to claim 1, wherein the link from the first exchange partner's web site is enabled by a links code pasted in a given links area on the first exchange partner's web site page which points to an addressable file at the intermediary web site storing link content of another interested exchange partner, for retrieving the link content and displaying it in the corresponding links area on the first exchange partner's web site.

3. A method according to claim 1, wherein the intermediary web site enables interested exchange partners to conduct a direct exchange of click-through traffic without a trial process.

4. A method according to claim 1, wherein the intermediary web site enables either the first or winning exchange partner to terminate the exchange relationship if it does not meet their requirements.

5. A method according to claim 1, wherein the intermediary web site is enabled to automatically select the other interested exchange partners whose websites had the best click-through parameters during the trial process for the bidding process.

* * * * *